United States Patent
Aida et al.

(10) Patent No.: US 9,470,203 B2
(45) Date of Patent: Oct. 18, 2016

(54) ION CURRENT DETECTOR

(75) Inventors: Futoshi Aida, Chiyoda-ku (JP);
Kimihiko Tanaya, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1415 days.

(21) Appl. No.: 12/506,010

(22) Filed: Jul. 20, 2009

(65) Prior Publication Data

US 2010/0186715 A1    Jul. 29, 2010

(30) Foreign Application Priority Data

Jan. 26, 2009   (JP) ................................. 2009-014274

(51) Int. Cl.
*F02P 17/12* (2006.01)
*F02D 35/02* (2006.01)
*F02P 5/153* (2006.01)

(52) U.S. Cl.
CPC ............. *F02P 17/12* (2013.01); *F02D 35/021* (2013.01); *F02P 5/153* (2013.01); *F02P 2017/125* (2013.01); *Y02T 10/46* (2013.01)

(58) Field of Classification Search
CPC ... F02P 17/12; F02P 2017/128; Y02T 10/46; G01L 23/225; G01L 23/221; F02D 35/021; F02D 2200/1015; G01M 15/11
USPC ............ 123/406.28, 406.27, 406.19, 406.21, 123/406.29, 630, 644; 324/380; 73/35.08; 701/111, 114
See application file for complete search history.

(56) References Cited

U.S. PATENT DOCUMENTS

| 5,834,630 | A | * | 11/1998 | Fukushi | ............................ 73/36 |
| 5,970,952 | A | * | 10/1999 | Mogi et al. | .............. 123/406.27 |
| 6,202,474 | B1 | * | 3/2001 | Takahashi et al. | ........... 73/35.08 |
| 6,328,016 | B1 | * | 12/2001 | Takahashi et al. | ....... 123/406.35 |

(Continued)

FOREIGN PATENT DOCUMENTS

| JP | 10-030541 A | | 2/1998 | |
| JP | 10030541 A | * | 2/1998 | .............. F02P 17/12 |

(Continued)

OTHER PUBLICATIONS

Communication from Japanese Patent Office dated Nov. 30, 2010.

*Primary Examiner* — Mahmoud Gimie
*Assistant Examiner* — Sizo Vilakazi
(74) *Attorney, Agent, or Firm* — Sughrue Mion, PLLC; Richard C. Turner (57) ABSTRACT

The ion current detector includes: an ion bias circuit for supplying a bias voltage to an electrode of the ignition plug so as to cause the ignition plug to generate a spark discharge; and an ion current detection circuit for detecting an ion current generated in a combustion chamber by the spark discharge and for amplifying the detected ion current to output an ion current detection signal. The ion current detection circuit amplifies the ion current at an ion current amplification factor switched between a time when an ignition signal is supplied and a time when the ignition signal is not supplied. Specifically, when the ignition signal is supplied, the ion current amplification factor is set to a low value (approximately 50). When the ignition signal is not supplied, the ion current amplification factor is set to a high value (250 or more).

9 Claims, 6 Drawing Sheets

(56) References Cited

U.S. PATENT DOCUMENTS

| | | | |
|---|---|---|---|
| 6,813,933 B1* | 11/2004 | Ketterer | F02P 17/12 |
| | | | 123/644 |
| 7,164,271 B2* | 1/2007 | Ando | 324/380 |
| 7,458,250 B2* | 12/2008 | Bengtsson | 73/35.08 |
| 7,467,626 B2* | 12/2008 | Naruse et al. | 123/605 |
| 8,490,598 B2* | 7/2013 | Qu | F02P 15/10 |
| | | | 123/406.12 |
| 2003/0101797 A1* | 6/2003 | Nishimoto et al. | 73/35.01 |
| 2006/0158195 A1* | 7/2006 | Ando | 324/380 |

FOREIGN PATENT DOCUMENTS

| JP | 2000-240551 A | 9/2000 |
|---|---|---|
| JP | 3605962 B2 | 10/2004 |

* cited by examiner

ION CURRENT DETECTOR

BACKGROUND OF THE INVENTION

1. Field of the Invention

The present invention relates to an ion current detector, and more particularly, to an ion current detector for detecting an ion current generated in an internal combustion engine.

2. Description of the Related Art

In a conventional ion current detector, a high voltage is applied to a discharge gap between a center electrode and a ground electrode of a spark plug to generate a spark discharge. When an ion current flowing through the discharge gap is to be detected, a connection terminal portion of the spark plug is coated with a conductive coating such as a coating plated with gold or silver to ensure the electrical conductivity of the connection terminal portion (see, for example, JP 3605962 B).

As described in JP 3605962 B, the structure in which the connection terminal portion is coated with the conductive coating such as the coating plated with gold or silver to ensure the electrical conductivity of the connection terminal portion has such a problem that a manufacturing cost increases.

There is also the following problem. When the spark plug smolders, soot generates between the electrodes, which causes a leak current to flow. When a pseudo state occurs, in which the ion current continuously flows (hereinafter, referred to as smoldering state), a smoldering current increases at the time of supplying an ignition signal because of an ignition signal turning-ON +V2. Therefore, an ion current detection signal to be transmitted to an engine control unit (ECU) exceeds a dynamic range of the ECU, with the result that it is difficult to transmit an accurate ion current detection signal to the ECU.

SUMMARY OF THE INVENTION

The present invention has been made to solve the problems as described above. An object of the present invention is to provide an ion current detector which includes a connection terminal portion having an ensured electrical conductivity and can detect an ion current with high precision, while a manufacturing cost thereof is suppressed.

The present invention provides an ion current detector including: an ion bias circuit connected to a secondary side of an ignition coil for causing an ignition plug of an internal combustion engine to generate spark discharge, for supplying a bias voltage to an electrode of the ignition plug; and an ion current detection circuit for detecting an ion current generated in a combustion chamber by the spark discharge, in which the ion current detection circuit amplifies and outputs the detected ion current at an amplification factor of the ion current, and the amplification factor of the ion current is switched between a time when an ignition signal is supplied and a time when the ignition signal is not supplied.

According to the present invention, the ion current detector includes: the ion bias circuit connected to the secondary side of the ignition coil for causing the ignition plug of the internal combustion engine to generate the spark discharge, for supplying the bias voltage to the electrode of the ignition plug; and the ion current detection circuit for detecting the ion current generated in the combustion chamber by the spark discharge. The ion current detection circuit amplifies and outputs the detected ion current at the amplification factor of the ion current, and the amplification factor of the ion current is switched between the time when the ignition signal is supplied and the time when the ignition signal is not supplied. Therefore, while the manufacturing cost is suppressed, the electrical conductivity of the connection terminal portion can be ensured. In addition, the ion current can be detected with high precision.

DETAILED DESCRIPTION OF THE PREFERRED EMBODIMENTS

Hereinafter, embodiments of the present invention are described with reference to the attached drawings.

Embodiment 1

Figure 1:
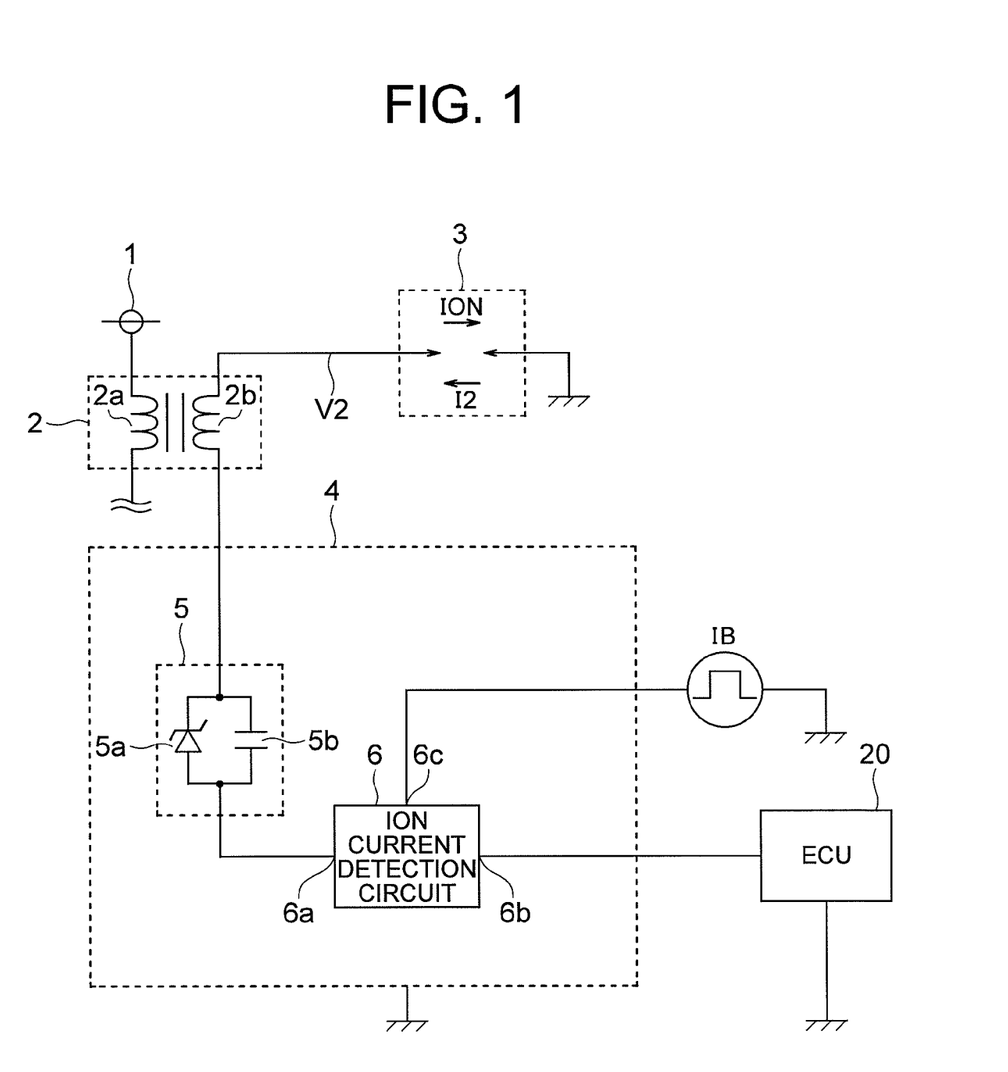
FIG. 1 is a structural diagram illustrating an ion current detector according to Embodiment 1 of the present invention.

FIG. 1 is a circuit diagram illustrating an ion current detector according to Embodiment 1 of the present invention. As illustrated in FIG. 1, an ion current detector 4 is connected to an ignition coil 2 for causing an ignition plug 3 of an internal combustion engine to generate spark discharge, an IB terminal for receiving an ignition signal IB, and an engine control unit (ECU) 20 serving as a control device of the internal combustion engine. The ion current detector 4 includes an ion bias circuit 5 and an ion current detection circuit 6. The ion bias circuit 5 is connected to a secondary coil 2b of the ignition coil 2 to supply a bias voltage to an electrode of the ignition plug 3. The ion current detection circuit 6 detects an ion current generated in a combustion chamber of the internal combustion engine.

One end of a primary coil 2a of the ignition coil 2 is connected to a battery power supply 1 and the other end of the primary coil 2a is connected to a switching element for ignition control (not shown). One end of the secondary coil 2b of the ignition coil 2 is connected to the electrode of the ignition plug 3 and the other end of the secondary coil 2b is connected to a cathode of a Zener diode 5a and one end of a capacitor 5b in the ion bias circuit 5. The Zener diode 5a and the capacitor 5b are connected in parallel. An anode of the Zener diode 5a and the other end of the capacitor 5b are connected to an input terminal 6a of the ion current detection circuit 6. The ion current detection circuit 6 includes the input terminal 6a, an output terminal 6b, and a current amplification factor control terminal 6c. The input terminal 6a is connected to the ion bias circuit 5 as described above. The output terminal 6b is connected to the ECU 20 serving as the control device of the internal combustion engine. The current amplification factor control terminal 6c is connected to the IB terminal.

In the structure described above, at the time of ignition, a positive voltage is applied to a low-voltage side of the secondary coil 2b to apply a voltage between both the ends of the Zener diode 5a, thereby charging the capacitor 5b. After the ignition, a charging voltage of the capacitor 5b is applied to the electrode of the ignition plug 3. As a result, ions generated when an air fuel mixture is burned in the combustion chamber flow as an ion current from the capacitor 5b to the secondary coil 2b, the ignition plug 3, and the ion current detection circuit 6. The ion current detection circuit 6 amplifies the ion current to generate an ion current detection signal ION-OUT and transmits the ion current detection signal to the ECU 20 through the output terminal 6b.

Upon receiving the ignition signal IB from the IB terminal through the current amplification factor control terminal 6c, the ion current detection circuit 6 detects a timing of supplying the ignition signal IB. Through the detection of the timing, an ion current amplification factor for amplifying the ion current detection signal ION-OUT at the time of supplying the ignition signal is set to a low value (approximately 50) (predetermined first value). When the ignition signal is not supplied (that is, during time domain in which ion current is small), the ion current amplification factor is set to a high value (approximately 250 or more) (predetermined second value). Accordingly, a value of the ion current detection signal ION-OUT at the time of supplying the ignition signal is not so large and the value in an accidental fire case is not so small. Therefore, when the ion current detection signal ION-OUT is to be transmitted to the ECU 20, the value of the ion current detection signal ION-OUT does not exceed a dynamic range of the ECU 20. In addition, even when the ion current in the accidental fire case is approximately 4 µA, a current equal to or larger than 1 mA can be supplied to a connection terminal portion between the ion current detection circuit 6 and the ECU 20. Thus, even when the connection terminal portion between the ion current detection circuit 6 and the ECU 20 is not subjected to gold or silver plating, the electrical conductivity of the connection terminal portion between the ion current detection circuit 6 and the ECU 20 can be ensured to constantly transmit the accurate ion current detection signal ION-OUT to the ECU 20. Note that, in order to suppress the value of the ion current detection signal ION-OUT to transmit the accurate ion current detection signal ION-OUT to the ECU 20 even in a case of a smoldering state, an upper limit value of the ion current detection signal ION-OUT which can be output from the ion current detection circuit 6 is set to 100 mA. When the value of the ion current detection signal ION-OUT exceeds 100 mA, for example, the current of 100 mA is held in order to recognize the flowing of the ion current, or the ion current detection signal is not output (0 mA) in order to suppress circuit power consumption resulting from the flowing of the current equal to or larger than 100 mA.

Figure 2:
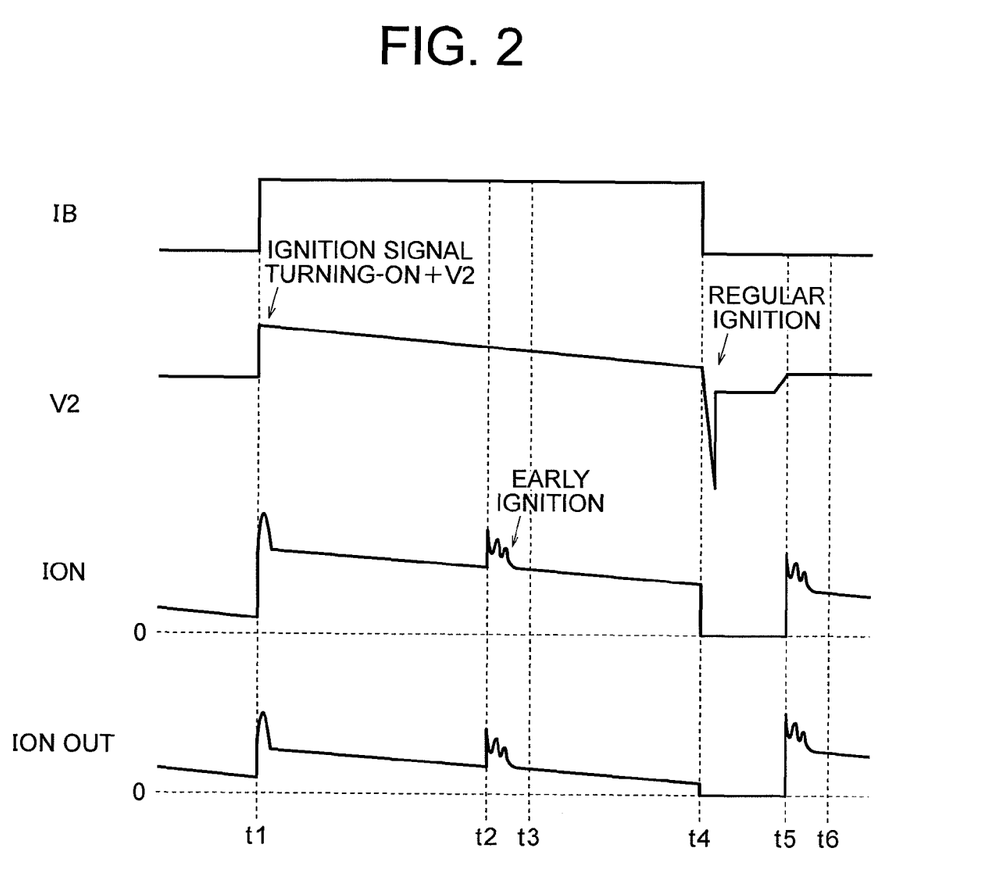
FIG. 2 is a timing chart illustrating an operation of the ion current detector at each operating point according to Embodiment 1 of the present invention.

FIG. 2 is a timing chart illustrating respective waveforms in the case of the smoldering state in Embodiment 1 of the present invention. At a time point t1, when the ignition signal IB is supplied from the ECU 20, an ignition signal turning-ON +V2 is generated on a high-voltage side of the secondary coil 2b. Therefore, a smoldering current at the time of supplying the ignition signal increases. At this timing, the ion current detection circuit 6 detects that the ignition signal IB is supplied, and sets the ion current amplification factor to the low value (approximately 50).

Next, during a period between time points t2 and t3, the ion current generated by early ignition at the time of supplying the ignition signal is superimposed on the smoldering current. Note that the ion current detection circuit 6 reduces the ion current amplification factor at the time point t1 as described above, and hence the ion current detection signal ION-OUT to be transmitted to the ECU 20 can be accurately transmitted to the ECU 20 without exceeding the dynamic range of the ECU 20. At a time point t4, when the ion current detection circuit 6 detects that the ignition signal IB is blocked, the ion current amplification factor is adjusted to the high value (approximately 250 or more). After that, during a period between time points t5 and t6, an ion current generated by regular ignition is transmitted to the ECU 20. In this case, the ion current detection circuit 6 has increased the ion current amplification factor at the time point t4 as described above, and hence the precision of the ion current detection signal ION-OUT to be transmitted to the ECU 20 can be improved. Even when the ion current in the accidental fire case is approximately 4 µA, the current equal to or larger than 1 mA can be supplied to the connection terminal portion between the ion current detection circuit 6 and the ECU 20, with the result that that the electrical conductivity of the connection terminal portion between the ion current detection circuit 6 and the ECU 20 can be ensured.

As described above, according to Embodiment 1 of the present invention, the ion current detector, which includes the ion bias circuit 5 for supplying the bias voltage to the electrode of the ignition plug and the ion current detection circuit 6 for detecting the ion current generated in the combustion chamber, has the structure in which the ion current detection circuit 6 switches the ion current amplification factor between the time of supplying the ignition signal and other time domains. Therefore, even in the case where the ion current becomes as small as approximately 4 µA because of an accidental fire or the like when the ion current detection signal ION-OUT obtained by amplifying the ion current is to be transmitted to the ECU 20, the ion current amplification factor is set to the high value, whereby the current equal to or larger than 1 mA can be supplied to the connection terminal portion between the ion current detection circuit 6 and the ECU 20 without coating the connection terminal portion with a conductive coating such as a coating plated with gold or silver. Thus, the electrical conductivity of the connection terminal portion between the ion current detection circuit and the ECU can be ensured. In addition, even when the smoldering current increases at the time of supplying the ignition signal during the smoldering state because of the ignition signal turning-ON +V2, the ion current amplification factor is set to the low value, whereby the accurate ion current detection signal ION-OUT can be transmitted to the ECU without exceeding the dynamic range of the ECU in the case where the ion current detection signal ION-OUT is to be transmitted to the ECU. Therefore, the accurate ion current detection signal ION-OUT can be constantly transmitted to the ECU 20. As described above, according to Embodiment 1 of the present invention, the gold or silver plating for the connection terminal portion can be omitted, thereby enabling suppressing a manufacturing cost. At the same time, the electrical conductivity of the connection terminal portion can be ensured. In addition, the ion current can be detected with high precision without exceeding the dynamic range of the ECU 20.

Embodiment 2

In Embodiment 2 of the present invention, an example in which the ion current detection circuit 6 described in Embodiment 1 is a circuit including current mirror circuits is described. Other structures and operations are the same as those of Embodiment 1, and hence the description thereof is omitted here.

Figure 3:
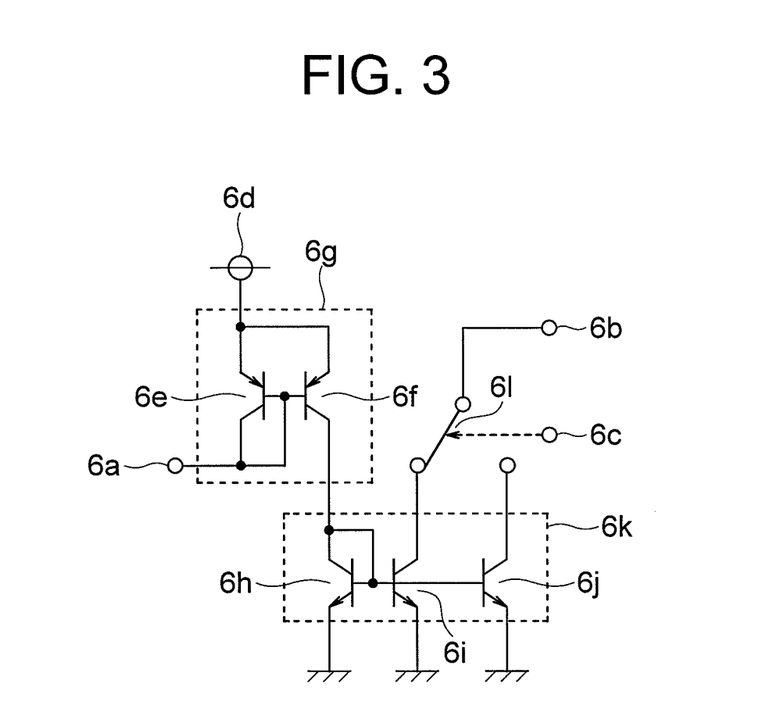
FIG. 3 is a circuit diagram illustrating an ion current detector according to Embodiment 2 of the present invention.

FIG. 3 is a circuit diagram illustrating an ion current detection circuit 6 according to Embodiment 2 of the present invention. An internal structure of the ion current detection circuit 6 is described with reference to FIG. 3. The ion current detection circuit 6 includes the input terminal 6a, the output terminal 6b, the current amplification factor control terminal 6c, an internal power supply 6d, a current mirror circuit 6g, a current mirror circuit 6k, and a switch 6l. The current mirror circuit 6g includes PNP transistors 6e and 6f. The current mirror circuit 6k includes an NPN transistor 6h, an NPN transistor 6i having a low current amplification factor (current amplification factor which is approximately 50 times current amplification factor of NPN transistor 6h), and an NPN transistor 6j having a high current amplification factor (current amplification factor which is approximately 250 times current amplification factor of NPN transistor 6h).

In the ion current detection circuit 6, as illustrated in FIG. 3, a base of the PNP transistor 6e is connected to a collector of the PNP transistor 6e and a base of the PNP transistor 6f. As illustrated in FIG. 1, the collector of the PNP transistor 6e is connected to the ion bias circuit 5 through the input terminal 6a. An emitter of the PNP transistor 6e is connected to the internal power supply 6d and an emitter of the PNP transistor 6f. A collector of the PNP transistor 6f is connected to a base and collector of the NPN transistor 6h, a base of the NPN transistor 6i having the low current amplification factor, and a base of the NPN transistor 6j having the high current amplification factor. An emitter of the NPN transistor 6h, an emitter of the NPN transistor 6i having the low current amplification factor, and an emitter of the NPN transistor 6j having the high current amplification factor are connected to a ground (GND).

As illustrated in FIG. 1, one end of the switch 6l is connected to the ECU 20 through the output terminal 6b. The other end of the switch 6l is connected to one of a collector of the NPN transistor 6i having the low current amplification factor and a collector of the NPN transistor 6j having the high current amplification factor in response to the ignition signal IB supplied to the current amplification factor control terminal 6c.

The other end of the switch 6l is connected to the collector of the NPN transistor 6i having the low current amplification factor at a timing when the ignition signal IB is supplied to the switch 6l through the current amplification factor control terminal 6c.

While the ignition signal IB is being supplied to the switch 6l, when the ion current flows and thus a current flows into the current mirror circuits 6g and 6k, a current obtained by amplifying the ion current by the low value (approximately 50) is extracted from the ECU 20 through the output terminal 6b because the switch 6l is connected to the NPN transistor 6i having the low current amplification factor. Then, the ion current detection signal ION-OUT is transmitted to the ECU 20.

Next, the other end of the switch 6l is connected to the collector of the NPN transistor 6j having the high current amplification factor at a timing when the ignition signal IB supplied to the switch 6l through the current amplification factor control terminal 6c is blocked.

While the ignition signal IB supplied to the switch 6l is being blocked, when the ion current flows and thus a current flows into the current mirror circuits 6g and 6k, a current obtained by amplifying the ion current by the high value (approximately 250 or more) is extracted from the ECU 20 through the output terminal 6b because the switch 6l is connected to the collector of the NPN transistor 6j having the high current amplification factor. Then, the ion current detection signal ION-OUT is transmitted to the ECU 20.

As described above, according to Embodiment 2 of the present invention, the same effect as Embodiment 1 can be obtained. In addition, the circuit including the current mirror circuits is used as the ion current detection circuit. The ion current detection circuit 6 receives the ignition signal IB to detect the timing of supplying the ignition signal. When the ignition signal is supplied, the ion current amplification factor is set to the low value (approximately 50). When the ignition signal is not supplied, that is, during the time domain in which the ion current is small, the ion current amplification factor is set to the high value (approximately 250 or more). Therefore, when the ion current detection signal ION-OUT is to be transmitted to the ECU 20, the value of the ion current detection signal ION-OUT does not exceed the dynamic range of the ECU 20. In addition, even when the ion current in the accidental fire case is approximately 4 μA, a current equal to or larger than 1 mA can be supplied to the connection terminal portion between the ion current detection circuit 6 and the ECU 20. Thus, electrical conductivity of the connection terminal portion between the ion current detection circuit 6 and the ECU 20 can be ensured to transmit the accurate ion current detection signal ION-OUT to the ECU 20.

Embodiment 3

In Embodiment 3 of the present invention, an example in which the ignition signal of the internal combustion engine ignition device described in Embodiment 1 is used as an ignition signal for multi-ignition is described. Other structures and operations are the same as those of Embodiment 1 or 2, and hence the description thereof is omitted here.

Figure 4:
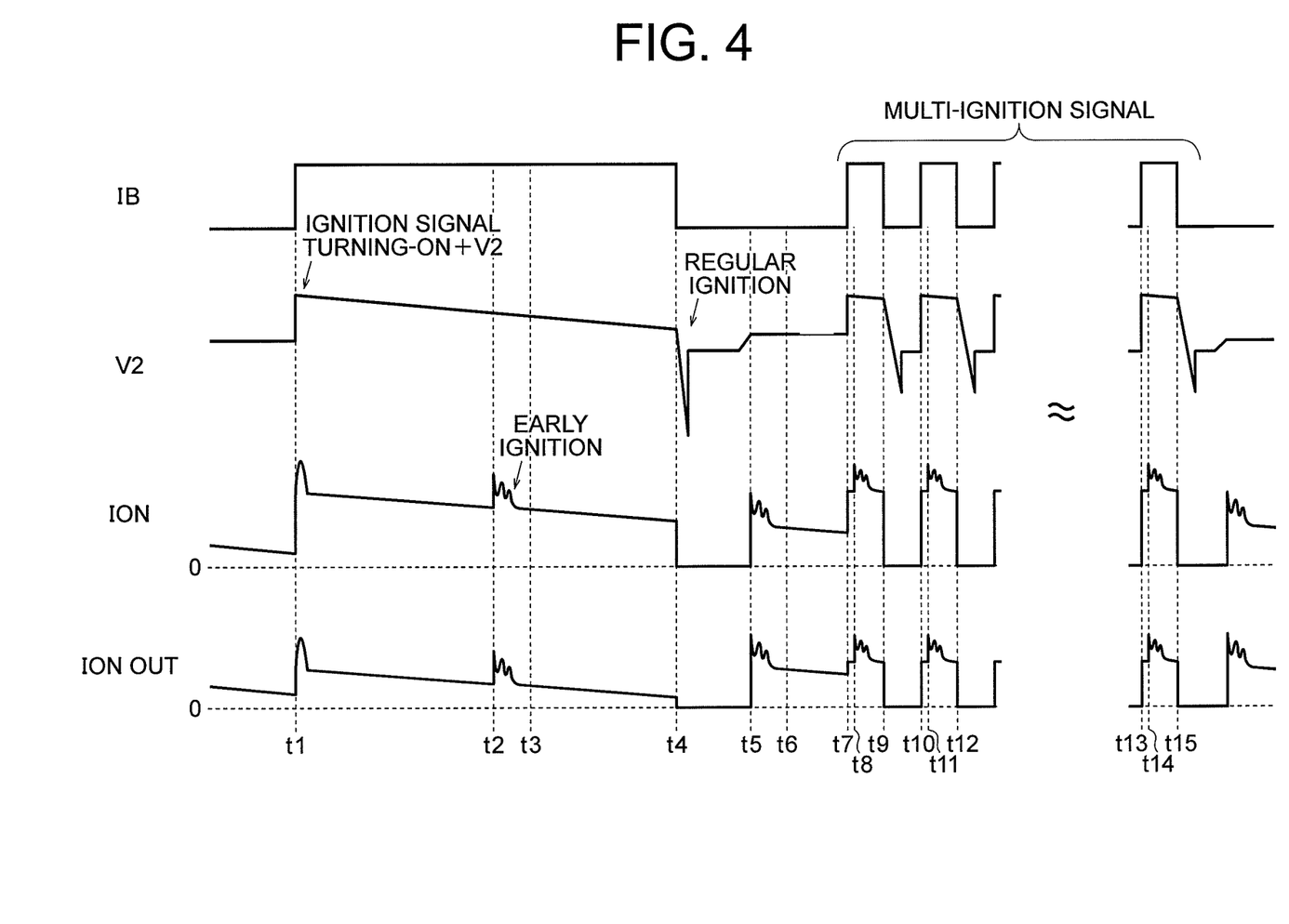
FIG. 4 is a timing chart illustrating an operation of an ion current detector at each operating point according to Embodiment 3 of the present invention.

FIG. 4 is a timing chart illustrating respective waveforms in the case of the smoldering state in Embodiment 3 of the present invention. The operation during a period between the time points t1 and t6 is the same as those of Embodiment 1, and hence the description thereof is omitted here. At a time point t7, when the multi-ignition signal is supplied from the ECU 20 as described above, an ignition signal turning-ON +V2 is generated on a high-voltage side of the secondary coil 2b. Therefore, a smoldering current at the time of supplying the ignition signal increases. At this timing, the ion current detection circuit 6 detects that the multi-ignition signal is supplied, and sets the ion current amplification factor to the low value (approximately 50).

Next, during a period between time points t8 and t9, the ion current generated by early ignition at the time of supplying the ignition signal is superimposed on the smoldering current. When the ion current detection circuit 6 sets the ion current amplification factor to the low value (approximately 50), the ion current detection signal ION-OUT to be transmitted to the ECU 20 can be accurately transmitted to the ECU 20 without exceeding the dynamic range of the ECU 20. At the time point t9, the ion current detection circuit 6 detects that the multi-ignition signal is blocked, and sets the ion current amplification factor to the high value (approximately 250 or more). The operation during a period between time points t10 and t12 and a period between time points t13 and t15 is identical to the operation during the period between the time points t7 and t9, and hence the description thereof is omitted here. With this structure, the combustion characteristic within the engine camber can be ensured. The precision of the ion current detection signal ION-OUT to be transmitted to the ECU 20 can also be improved. Even when the ion current in the accidental fire case is approximately 4 μA, the current equal to or larger than 1 mA can be supplied to the connection terminal portion between the ion current detection circuit 6 and the ECU 20, whereby the electrical conductivity of the connection terminal portion between the ion current detection circuit 6 and the ECU 20 can be ensured.

As described above, according to Embodiment 3 of the present invention, the same effect as Embodiments 1 and 2 can be obtained. Upon receiving the multi-ignition signal IB, the ion current detection circuit 6 detects the timing of supplying the ignition signal. When the ignition signal is supplied, the ion current amplification factor is set to the low value (approximately 50). When the ignition signal is not supplied, that is, during the time domain in which the ion current is small, the ion current amplification factor is set to the high value (approximately 250 or more). Therefore, when the ion current detection signal ION-OUT is to be transmitted to the ECU 20, the value of the ion current detection signal ION-OUT does not exceed the dynamic range of the ECU 20. In addition, even when the ion current in the accidental fire case is approximately 4 μA, the current equal to or larger than 1 mA can be supplied to the connection terminal portion between the ion current detection circuit 6 and the ECU 20. Thus, the electrical conductivity of the connection terminal portion between the ion current detection circuit 6 and the ECU 20 can be ensured to transmit the accurate ion current detection signal ION-OUT to the ECU 20.

Embodiment 4

Figure 5:
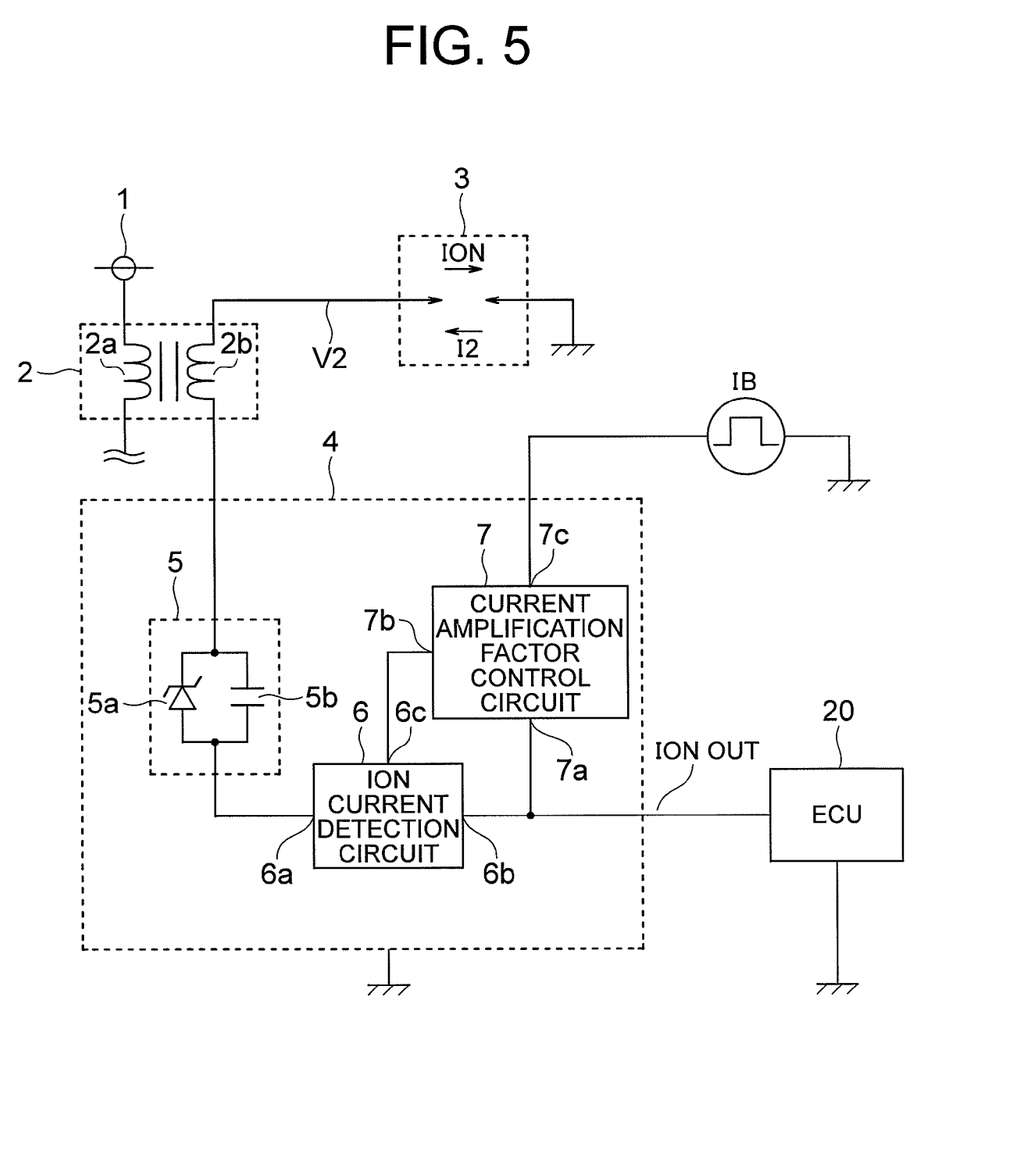
FIG. 5 is a structural diagram illustrating an ion current detector according to Embodiment 4 of the present invention.

FIG. 5 is a circuit diagram illustrating an ion current detector according to Embodiment 4 of the present invention.

In Embodiment 4 of the present invention, a current amplification factor control circuit 7 is further provided in the structure of the ion current detector 4 according to Embodiment 1. Other structures are the same as those of Embodiments 1 to 3. The flow (operation) before the generation of the ion current is identical to that of Embodiment 1, and hence the description thereof is omitted here.

The current amplification factor control circuit 7 is described. The current amplification factor control circuit 7 is a circuit for detecting a regular ignition timing in response to the ignition signal IB, detecting a combustion state of the internal combustion engine, and controlling the ion current amplification factor based on a result obtained by the detection. The current amplification factor control circuit 7 includes an abnormal detection terminal 7a, a current amplification factor control signal output terminal 7b, and an ignition signal receiving terminal 7c. The abnormal detection terminal 7a is connected to the output terminal 6b of the ion current detection circuit 6 to receive the value of the ion current detection signal ION-OUT transmitted to the ECU 20. The current amplification factor control signal output terminal 7b is connected to the current amplification factor control terminal 6c of the ion current detection circuit 6 to output, to the ion current detection circuit 6, a control signal for instructing switching of the ion current amplification factor when it is determined that it is necessary to switch the ion current amplification factor. The ignition signal receiving terminal 7c is connected to the IB terminal to receive the ignition signal IB from the IB terminal.

Figure 6:
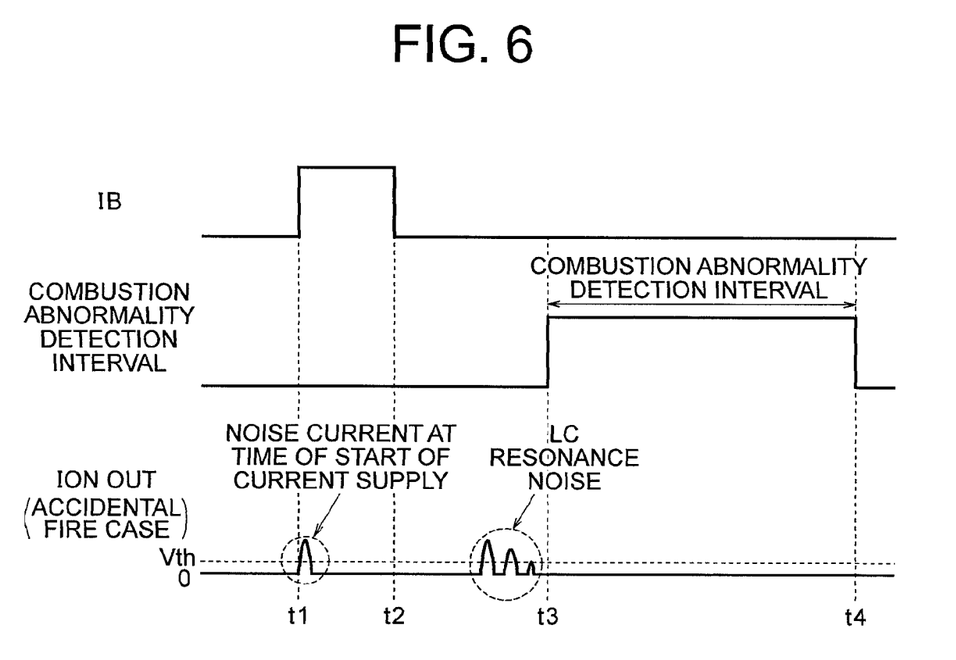
FIG. 6 is a timing chart illustrating an operation of the ion current detector at each operating point according to Embodiment 4 of the present invention.

FIG. 6 is a timing chart illustrating waveforms in respective portions of the internal combustion engine in Embodiment 4 of the present invention in a case of occurrence of combustion abnormality (accidental fire case). During a period between time points t1 and t2, the current amplification factor control circuit 7 receives the ignition signal IB from the IB terminal through the ignition signal receiving terminal 7c to detect whether or not the ignition signal is supplied, and sets, as a combustion abnormality detection interval, a predetermined interval between t3 and t4 after the ignition signal IB is blocked. In the accidental fire case, the ion current is approximately 4 μA. Therefore, during the combustion abnormality detection interval, the ion current detection signal ION-OUT transmitted to the ECU 20 is compared with a predetermined threshold Vth (corresponding to ion current of 4 μA) which is set in advance. When the value of the ion current detection signal ION-OUT does not exceed the threshold Vth, the current amplification factor control circuit 7 detects that an accidental fire occurs, and thus supplies a control signal from the current amplification factor control signal output terminal 7b to the current amplification factor control terminal 6c of the ion current detection circuit 6 so as to set the ion current amplification factor for amplifying the ion current detection signal ION-OUT to the high value (250 or more). The ion current detection circuit 6 sets the ion current amplification factor to the high value (250 or more) in response to the control signal.

Therefore, the precision of the ion current detection signal ION-OUT can be improved. In addition, even when the ion current in the accidental fire case is approximately 4 μA, the current equal to or larger than 1 mA can be supplied to the connection terminal portion between the ion current detection circuit 6 and the ECU 20, whereby the electrical conductivity of the connection terminal portion between the ion current detection circuit 6 and the ECU 20 can be ensured.

Even in Embodiment 4 of the present invention, when the ignition signal is supplied, the ion current amplification factor for amplifying the ion current detection signal ION-OUT may be set to the low value (approximately 50). In the case of Embodiment 4, the current amplification factor control circuit 7 receives the ignition signal IB from the IB terminal through the ignition signal receiving terminal 7c to detect the timing of supplying the ignition signal IB. Through the detection of the timing, when the ignition signal is supplied, the current amplification factor control circuit 7 supplies a control signal from the current amplification factor control signal output terminal 7b to the current amplification factor control terminal 6c of the ion current detection circuit 6 so as to set the ion current amplification factor for amplifying the ion current detection signal ION-OUT to the low value (approximately 50). The ion current detection circuit 6 sets the ion current amplification factor to the low value (approximately 50) in response to the control signal. Therefore, the ion current detection signal ION-OUT to be transmitted to the ECU 20 can be accurately transmitted to the ECU 20 without exceeding the dynamic range of the ECU 20.

Moreover, according to the internal combustion engine ignition device in Embodiment 4 of the present invention, without using the conductive coating such as the coating plated with gold or silver for the connection terminal portion between the ion current detection circuit 6 and the ECU 20 in the structures according to Embodiments 1 to 3, the ion current amplification factor of the ion current detection circuit 6 is set such that the amplified ion current flowing between the ion current detection circuit 6 and the ECU 20 is equal to or larger than 1 mA.

Therefore, even when the ion current in the accidental fire case is approximately 4 μA, the current equal to or larger than 1 mA can be supplied to the connection terminal portion between the ion current detection circuit 6 and the ECU 20. Thus, the electrical conductivity of the connection terminal portion between the ion current detection circuit 6 and the ECU 20 can be ensured without using the conductive coating such as the coating plated with gold or silver for the connection terminal portion between the ion current detection circuit 6 and the ECU 20.

What is claimed is:

1. An ion current detector, comprising:
    an ion bias circuit connected to a secondary side of an ignition coil for causing an ignition plug of an internal combustion engine to generate spark discharge, for supplying a bias voltage to an electrode of the ignition plug; and
    an ion current detection circuit, coupled to an ignition signal terminal and to an engine control unit (ECU) via a connection terminal portion, which receives an ignition signal from the ignition signal terminal and detects an ion current generated in a combustion chamber by the spark discharge,
    wherein the ion current detection circuit amplifies and outputs the detected ion current to the ECU via the connection terminal portion, at an amplification factor of the ion current, and
    the amplification factor of the ion current is switched between a time when the ignition signal is supplied and a time when the ignition signal is not supplied, based on the received ignition signal.

2. The ion current detector according to claim 1, wherein the ion current detection circuit sets the amplification factor of the ion current to a predetermined first value when the ignition signal is supplied, and sets the amplification factor of the ion current to a predetermined second value higher than the predetermined first value when the ignition signal is not supplied.

3. The ion current detector according to claim 1, wherein the ion current detection circuit comprises a current mirror circuit.

4. The ion current detector according to claim 1, wherein the ignition signal comprises an ignition signal for multi-ignition.

5. The ion current detector according to claim 1, wherein the amplification factor of the ion current is set such that the amplified ion current flowing through the connection terminal portion between the ion current detection circuit and the ECU is equal to or greater than approximately 1 mA.

6. An ion current detector, comprising:
    an ion bias circuit connected to a secondary side of an ignition coil for causing an ignition plug of an internal combustion engine to generate spark discharge, for supplying a bias voltage to an electrode of the ignition plug; and
    an ion current detection circuit, coupled to an ignition signal terminal and to an engine control unit (ECU) via a connection terminal portion, which:
        receives an ignition signal, which indicates a timing of the ignition signal, from the ignition signal terminal,
        determines a first time period when the ignition signal is supplied and a second time period when the ignition signal is not supplied, based on the received ignition signal,
        detects an ion current generated in a combustion chamber by the spark discharge,
        amplifies the detected ion current at a first amplification factor during the first time period and a second amplification factor during the second time period, and
        outputs the ion current to the ECU via the connection terminal portion at the first amplification factor during the first time period, when the ignition signal is supplied, and at the second amplification factor during the second time period, when the ignition signal is not supplied.

7. The ion current detector according to claim 6, wherein the first amplification factor is set to a predetermined first value and the second amplification factor is set to a predetermined second value greater than the predetermined first value.

8. The ion current detector according to claim 1, wherein the ion bias circuit comprises:
    a diode comprising a cathode connected to the secondary side of the ignition coil and an anode connected to the ion current detection circuit; and
    a capacitor connected in parallel to the diode.

9. The ion current detector according to claim 8, wherein the ion current detection circuit comprises an input terminal, and
    the diode and the capacitor of the ion bias circuit are connected to the input terminal.

* * * * *